United States Patent [19]

Klann

[11] Patent Number: 4,527,782
[45] Date of Patent: Jul. 9, 1985

[54] SPRING CRAMP

[76] Inventor: Horst Klann, Terra Wohnpark 12, D-7730 Villingen-Schwenningen 24, Fed. Rep. of Germany

[21] Appl. No.: 572,517

[22] Filed: Jan. 20, 1984

[30] Foreign Application Priority Data

Feb. 9, 1983 [DE] Fed. Rep. of Germany ....... 3304321

[51] Int. Cl.³ .............................................. F16F 1/12
[52] U.S. Cl. .................................... 267/177; 267/179
[58] Field of Search ................ 267/60, 61 S, 170, 174, 267/175, 177, 178, 179

[56] References Cited

U.S. PATENT DOCUMENTS 3,256,594  6/1966  Howard et al. ........................ 29/227

FOREIGN PATENT DOCUMENTS 344191  6/1905  France ................................ 267/177
916897  1/1963  United Kingdom ................ 267/177

Primary Examiner—Duane A. Reger
Attorney, Agent, or Firm—McGlew and Tuttle

[57] ABSTRACT

A spring cramp for large helical springs, particularly axle springs of motor vehicles, comprises two loose disc-shaped pressure plates having annular contact surfaces serving as abutments for the spring turns and provided each with a central hole, a threaded spindle, and a threaded tube. The threaded spindle is mounted by means of an axial bearing for rotary motion and concentrically in a guide tube on which a shoulder is provided near the head of the spindle, which shoulder is formed with two lug elements for securing a lower one of the pressure plates at the side of the spindle head against rotation. The threaded tube which is threadable onto the spindle may be advantageously telecopically inserted into the guide tube. The threaded tube and the guide tube are non-rotatably connected to each other by two slot-and-feather connections. The threaded tube can be connected non-rotatably, in the direction of axial tension, to the other pressure plate, so that during the compression of a spring, the two plates are secured against mutual rotation.

15 Claims, 9 Drawing Figures

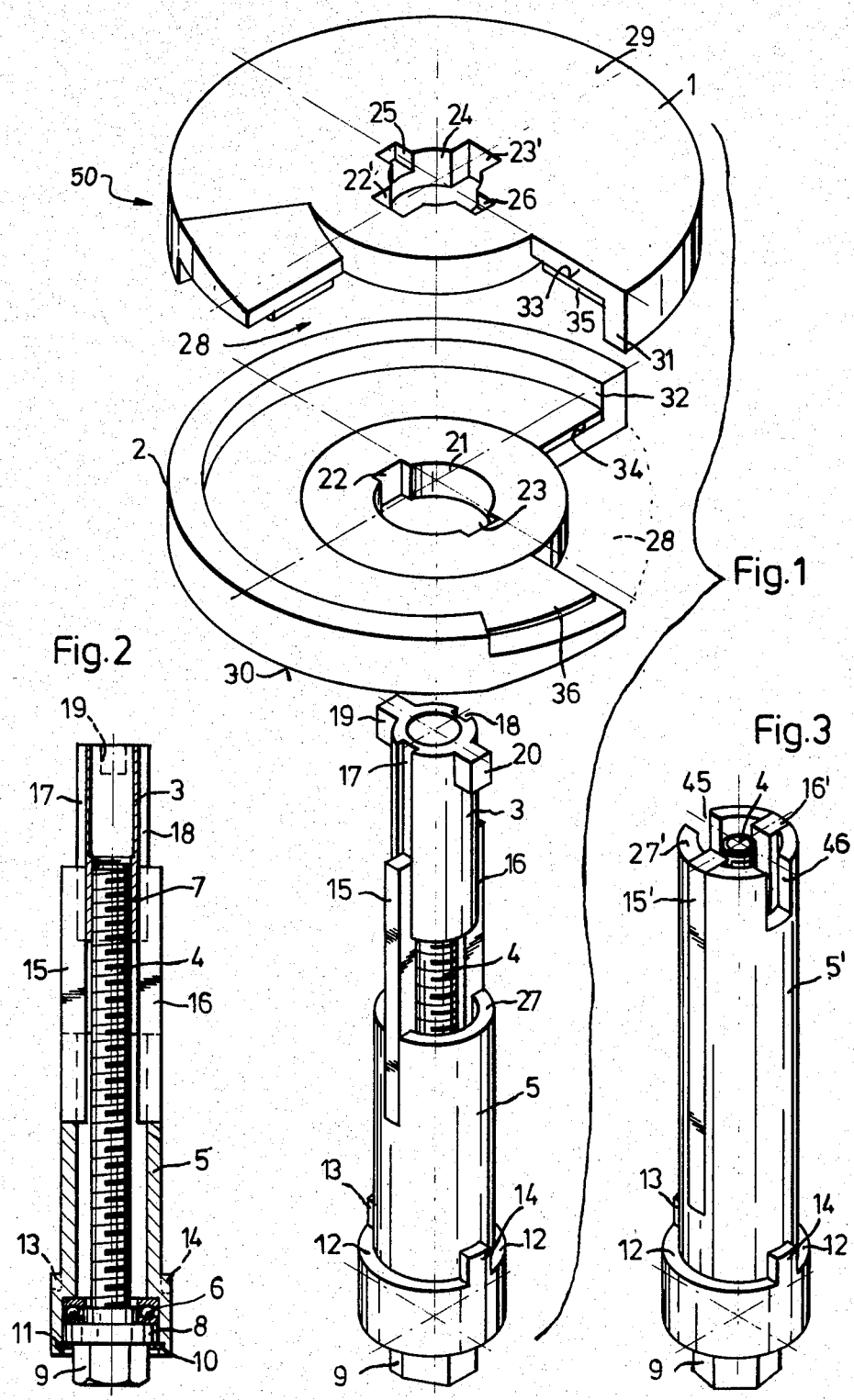

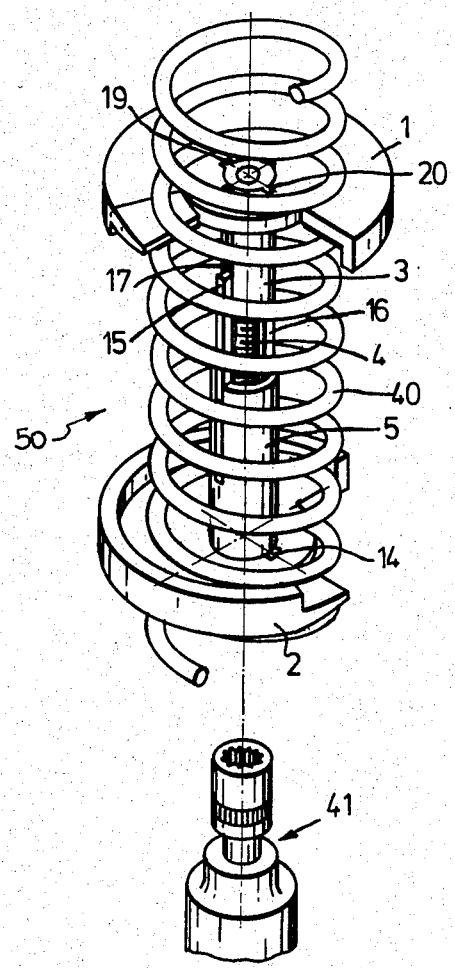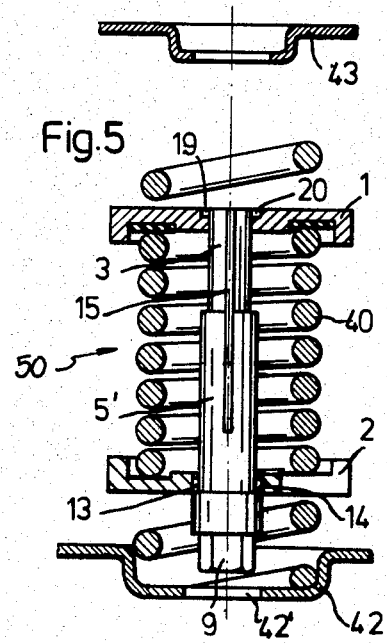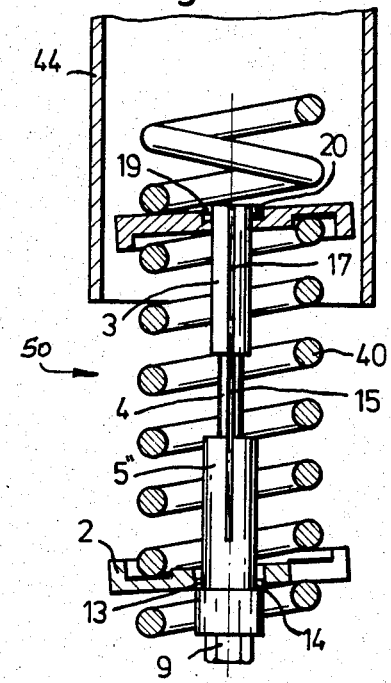

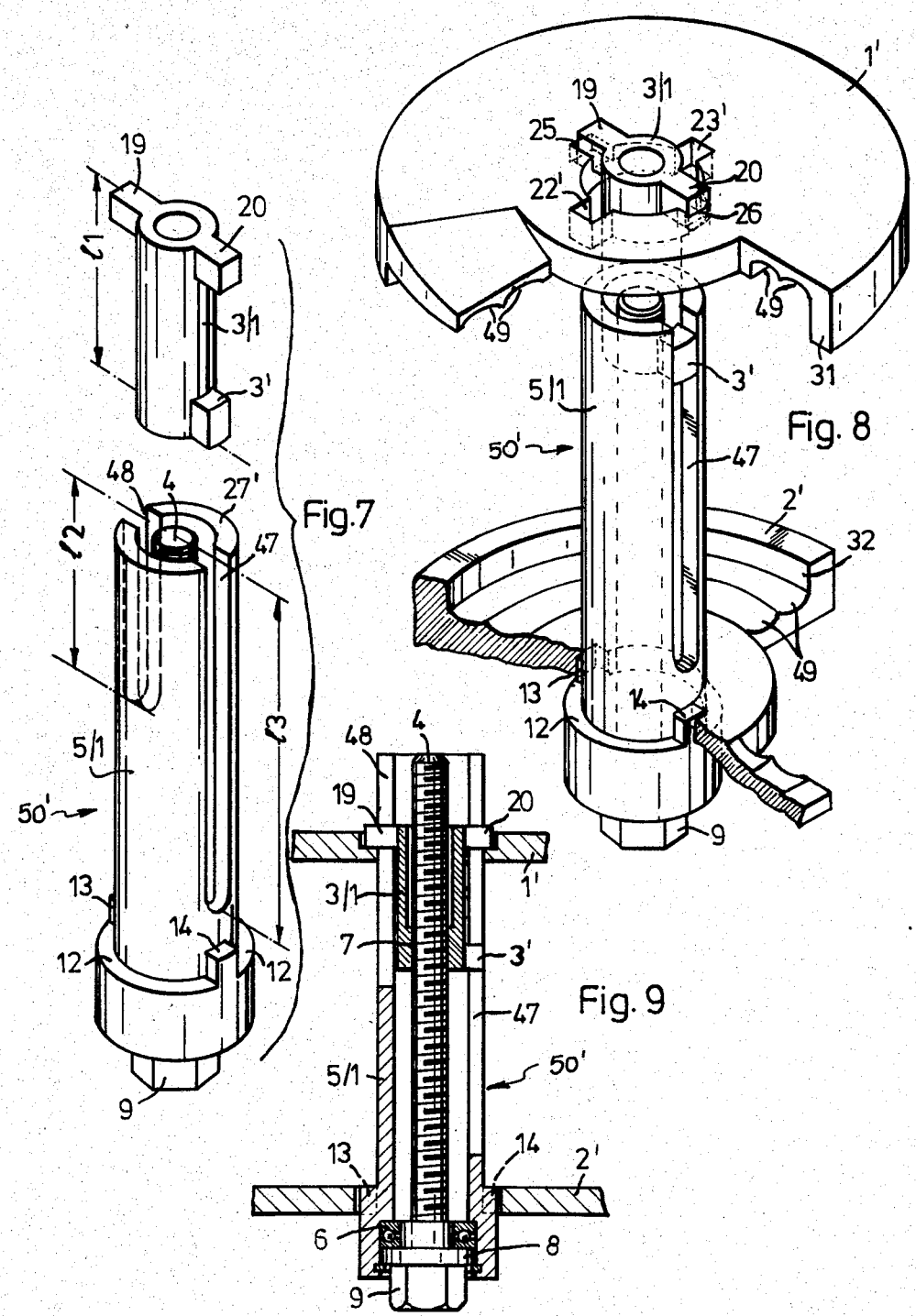

SPRING CRAMP

FIELD AND BACKGROUND OF THE INVENTION

This invention relates in general to spring handling devices and in particular to a new and useful spring cramp for large helical springs.

In a prior art spring cramp of this kind (U.S. Pat. No. 3,256,594) the spindle head is rotatably applied, by means of an annular flange, and near the rim of the central bore, against the outside of the pressure plate at the spindle head side, and, with the pressure plate at standstill, the spindle can rotate. The pressure plate which is secured to the threaded tube and also has a central bore, is non-rotatably connected to the pressure plate through two diametrically opposite radial fingers which engage between pins provided on the outside of the pressure plate and at the same time apply against the rim of the central bore. The pressure plates have recesses allowing the radial fingers of the threaded tube to pass through. Since there is no security against rotary motion, so that the two pressure plates can freely rotate relative to each other and be prevented therefrom only by the friction between the threads, such prior art cramps cannot be employed in practice, for reasons of safety. Experience has shown that due to the pitch of the springs, the two pressure plates, and the spindle and threaded tube along therewith, may automatically start turning, and unscrew the spindle from the threaded tube, so that the spring becomes free in an uncontrolled manner. This cannot be remedied by a left-hand spindle, because this would lead to another hazard of giving the spindle a wrong direction of rotation, again with the dangerous consequences.

SUMMARY OF THE INVENTION

The invention is directed to an improvement of a spring cramp preventing the two pressure plates, as soon as they are engaged with the spindle and the threaded tube which is secured thereto, from turning relative to each other, thus making the handling simple and safe.

In accordance with the invention there is provided a spring cramp for large helical springs which comprises first and second loose disc-shaped pressure plates each of which has a facing contact surface which provides a spring turn abutment, and each has a central hole therethrough. An internally threaded tube is engageable through a hole in the first plate and a guide tube is engageable through the hole in the other second plate. A threaded spindle is journalled in the guide tube for rotation and is threadably engaged with the internally threaded tube. The guide tube has a radially outwardly projecting shoulder. Radially interengaging projection and groove formations are defined between the guide tube and the second disc and prevents rotation of the guide tube relative to the second disc. A radially interengaging second projection and groove formation is defined between the guide tube and the threaded tube and this is advantageously in the form of and axially shiftable slotted feather connection which prevents relative rotation of the guide tube and the threaded tube.

Such a spring cramp can be handled in an as simple manner and with the same advantages as prior art devices of this kind, and has in addition the crucial advantage that the two pressure plates, when in stressed condition, cannot turn relative to each other, even though they can, as before, be moved axially toward each other. The considerably dangerous possibility that the spring would spontaneously turn out of its clamped position between the pressure plates and/or that the threads of the spindle and the tube would uncontrollably unscrew, is thereby eliminated.

To avoid reducing the maximum possible spring compression by the length of the guide tube, the threaded tube is made telescopically introducible into the guide tube.

The threaded tube is advantageously telescoped into the guide tube and it is advantageously provided with cylindrical outer surface having at least one axial groove which is open at each of its ends and into which at least one feather secured in or to the guide tube is engaged for axial displacement in the manner of a key. In this way a satisfactory non-rotatable guidance is established between the guide tube and the threaded tube which allows an unobstructed axial displacement of the threaded tube relative to the guide tube.

The feather advantageously terminates at least approximately in the plane in which the spindle end remote from the head of the spindle extends. This ensures a non-rotatable connection between the guide tube and the threaded tube over the entire length of the working stroke.

The length of the guide tube is made at least approximately equal to that of the spindle. In one embodiment the guide tube has about half the length of the spindle. This makes the device more resistant against torsion as compared to another embodiment where the feathers extend beyond the end of the guide tube.

Since very large torques occur in such spring cramps between the two pressure plates in the stressed state, it is advantageous to provide the threaded tube on its outer surface with two diametrically opposite axial grooves which receive feathers from the guide tube. Such a double slot and feather connection between the threaded tube and the guide is advisable in both embodiments.

In still another embodiment, the radial projection is provided at the threaded tube end at the spindle head side and engages an axial guide slot of the guide tube and extends approximately up to the shoulder of the guide tube. The advantages of this embodiment are a considerable resistance to torsion of the guide tube and permits a simple manufacture and reliable operation.

The radial projection axially aligns with one of the radial fingers and the guide tube is provided with a second axial slot which is diametrically opposite to the guide slot and also open on its front side. This is intended to receive the second radial finger which extends diametrically opposite to the radial projection. This makes it possible to make the working stroke longer than the axial length of the threaded tube, since the threaded tube can be introduced into the guide tube by more than its axial length.

In order to avoid an undue reduction of the resistance to torsion of the guide tube caused by the second axial slot, it is advisable to make the second axial slot shorter by about the length of the threaded tube, than the guide slot which extends diametrically opposite and whose length determines the maximum working stroke.

In all of the embodiments it is advantageous to ensure that the pressure plates are provided with a central bore having a diameter which is slightly greater than the outer diameter of the guide tube and the length of each of the radial fingers of the threaded tube are made to exceed the radius of the central bore. This makes it possible to even slip a pressure plate over the guide tube and this is positively connected to the threaded tube by means of two radial fingers and thus makes it possible to obtain a maximum working stroke which is longer than the guide tube or the threaded tube.

The pressure plate can be brought into tensional connection with the threaded tube and is provided in its external rim zone of its central bore with diametrical recesses into which the radial fingers cross-sectionally conformable thereto are engageable. This makes it possible in a very simply manner to bring the pressure plates into engagement with the radial fingers of the threaded tube and in addition to establish a reliable connection which is easily engageable and disengageable in a released position and to secure against rotation an axially firm and compressed position.

A shoulder of the guide tube is provided with at least one axial projection which is associated with at least cross-sectionally conformable radial recess provided in the wall of the central bore of the pressure tube at the spindle head side so as to establish a non-rotatable positive connection. It is possible to provide two such axial projections at diametrically opposite locations and to use their front faces as abutments for the pressure plate at the spindle head side, provided that this pressure plate and also the other pressure have two corresponding recesses on their exterior sides into which the projections can positively engage in order to form a tensional connection against rotation. In such an embodiment the two plates may be of identical configuration.

In order to give the spring to be tensioned or the turns thereof a satisfactory seat on the pressure plates they are provided with contact surfaces for the spring turns of the spring to be tensioned which have the shape of angular sectors and are provided with guide grooves and/or coated with a friction lining.

Accordingly, it is an object of the invention to provide a spring cramp which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is an exploded perspective view of a first embodiment of a spring cramp constructed in accordance with the invention;

FIG. 2 is a sectional view of one part of the cramp of FIG. 1;

FIG. 3 is a perspective view of another embodiment of the guide tube;

FIG. 4 is a perspective view of the cramp of FIG. 1 as used on a helical spring;

FIG. 5 is a sectional view of the cramp of FIG. 1 with the spring tensioned;

FIG. 6 is a sectional view of the cramp of FIG. 1 as used with a compression spring partly extending into a so-called dome of a motor vehicle;

FIG. 7 is an exploded perspective view of another embodiment of a threaded tube and guide tube of the cramp;

FIG. 8 is a perspective view of a complete spring cramp having the parts shown in FIG. 7; and FIG. 9 is a sectional view of the cramp of FIG. 8.

DESCRIPTION OF THE PREFERRED EMBODIMENTS

Referring to the drawings in particular the invention embodied therein in FIGS. 1 and 2 comprises a spring cramp generally designated 50 for large helical springs which comprises first and second loose disc-shaped pressure plates 1 and 2, each of which has a facing contact surface 33 which provides a spring turn abutment for a coil winding of the helical spring. Each of the plates 1 and 2 has a central hole or bore 24 and 21 respectively. An internally threaded tube 3 is engageable through the bore 24 in the first plate and a guide tube 5 is engageable through the bore 21 in the second plate. A threaded spindle is journalled at its head end 9 in a rotatable bearing 6 in the guide tube 5 and it is threadably engaged with the internally threaded tube 3. The guide tube 5 has a radially outwardly projecting shoulder 12 and is advantageously provided with diametrically opposite outwardly projecting lugs 13 and 14 arranged above the shoulder and projecting radially outwardly which engage in a groove formation 22 and 23 defined in the second plate 2. The projection and groove formation prevents rotation of the guide tube 5 relative to the second plate 2. The second projection and groove formation comprising feathers 15 and 16 which are carried by the tube 5 and engage in grooves 17,18 of the tube 6 to prevent rotation of the guide tube 5 relative to tube 3.

A spring cramp generally designated 50 in FIGS. 1 and 2 substantially comprises two pressure plates 1 and 2, a threaded tube 3, a threaded spindle 4 screwable into the threaded tube, and a guide tube 5 in which threaded spindle 4 is received. Threaded tube 3 has an internal thread 7 in its lower portion (FIG. 2) extending over about one third of the total length of tube 3, into which spindle 4 can be screwed. Through an axial bearing 6 and by means of its flange 8 and a lock washer 11 seated in an annular groove 10, threaded spindle 4 is coaxially mounted inside tube 5 for rotary motion and secured against axial displacement. The lower end (FIG. 1) of spindle 4 protrudes from guide tube 5 and is shaped as a spindle head or nut 9 for a wrench. A short portion adjacent spindle head 9 of the guide tube 5 is enlarged in diameter and forms on its side remote from the spindle head a radially extending shoulder 12 wherefrom two lugs 13, 14 project at diametrically opposite locations in the axial direction.

In the embodiment of FIGS. 1 and 2, the length of guide tube 5 is about half the length of spindle 4. However, guide tube 5 carries extensions in the form of two diametrically opposite feathers 15, 16 which terminate about in the same plane as spindle 4 and engage corresponding grooves which, with tube 3 and spindle 4 in engagement, as shown, extend axially in the cylindrical outer surface of threaded tube 3. The inside diameter of guide tube 5 is large enough to allow tube 3 to telescope therein. In an engaged state, the two feathers 15 and 16 project radially into grooves 17, 18 along their entire length and by the depth of these grooves. This slot and feather connection makes sure that the threaded tube 3 will not turn relative to the guide tube 5 as long as the feathers 15,16 engage grooves 17, 18. On the upper end of feather tube 3, two radial fingers 19, 20 are provided at diametrically opposite locations. While lugs 13 and 14 of shoulder 12 ensure a non-rotatable tensional connection between the pressure plate 2 and guide tube 5, radial fingers 19,20 ensure a non-rotatable tensional connection between pressure plate 1 and threaded tube 3. Pressure plate 2 which, in use, applies against shoulder 12, thus extends near the spindle head, has a central bore 21 whose diameter slightly exceeds the outer diameter of guide tube 5 but, of course, is smaller than the outer diameter of shoulder 12. Further, two radial, groove-like recesses 22 and 23 are provided in bore 21, intended to positively engage with axially extending lugs 13, 14. Recesses 22,23 also are dimensioned to let pass therethrough radial fingers 19 and 20. The cross-sections of recesses 22 and 23, lugs 13 and 14, and radial fingers 19 and 20 are selected to permit easy interengagement.

The other pressure plate 1, to be non-rotatably tensionally connected to threaded tube 3, also has a central bore 24 provided with two axially open recesses 22',23' provided at diametrically opposite locations. These recesses 22' and 23' also serve the purpose of letting pass therethrough radial fingers 19 and 20 of threaded tube 3, and have therefore the same dimensions as recesses 22 and 23 of central bore 21 of pressure plate 2. On the outside of plate 1, visible in FIG. 1, two recesses 25 and 26 are provided in central bore 24 which are offset through 90° relative to recesses 22' and 23' and intended for receiving radial fingers 19, 20 in positive engagement to establish the non-rotatable tensional connection between threaded tube 3 and pressure plate 1. If, as shown in FIG. 1, the diameter of central bore 24 is only slightly larger than the outer diameter of threaded tube 3, so that guide tube 5 cannot penetrate into central bore 24, the clamping stroke is limited by plate 1 butting against the upper front face 27 of guide tube 5. However, if central bore 24 has a larger diameter permitting guide tube 5 to penetrate therein, and if, in addition, as shown in FIG. 3, guide tube 5 is provided with axial slots permitting radial fingers 19, 20 to penetrate therein, the clamping stroke is not limited by guide tube 5 at all. Aside from the differences in the configuration of central bores 21 and 24 and recesses 25 and 26, the two pressure plates 1 and 2 are substantially identical in design. It is certainly possible, however, to make the two pressure plates identical also in their central bore portions, as will be explained hereinafter. Either of the pressure plates has the form of a circular dish-shaped plate with a removed segment 28 of 70° to 90° cut away and serving the purpose of letting pass therethrough a portion of a spring turn. The outer sides 29 and 30 of the pressure plates which are turned away from each other are smooth. On the inner sides facing each other, helically extending annular areas 33 and 34 are provided inside a circumferential flange 31 and 32, which areas, in the embodiment of FIG. 1 are coated with a friction lining 35 and 36 in the form of a rubber band fixed thereto by an adhesive or by vulcanization. These friction linings 34 and 36 are intended to improve the hold in radial direction of the respective spring turn to which the plate is applied. Instead of a rubber band, an emery strip may be provided as the friction lining, for example, or instead of providing a friction lining, one or more concentric grooves may be worked in the annular areas 33 and 34 as elements effecting a centering of the clamped spring turns.

The operation of such a spring cramp will now be explained with reference to FIGS. 4, 5 and 6. FIG. 4 shows a helical spring 40 dismounted from a motor vehicle, or going to be mounted, in which the spring cramp of FIG. 1 has already been inserted, ready for clamping. This is done by first inserting pressure plates 1 and 2 into the shown positions separately, from the side, between two respective turns of helical spring 40 until they are located about concentrically of the turns. Then, from below, the clamping assembly formed by threaded tube 3, threaded spindle 4, and guide tube 5 is introduced in the axial direction to pass first through lower pressure plate 2 and then through upper pressure plate 1, and radial fingers 19 and 20 are engaged into respective recesses 25 and 26 of upper plate 1. At the same time, axially extending lugs 13 and 14 must come into engagement with recesses 22 and 23 of lower plate 2 and the rim of central bore 21 must apply against shoulder 12. Spindle 4 can then be turned by hand or by means of an impact wrench 41, so that the plates 1 and 2 are moved toward each other and the spring turns therebetween are compressed. As shown, some turns of helical spring 49 still remain outside plates 1 and 2. They participate in the shortening of the spring, only they are not compressed themselves.

The spring turns extending between pressure plates 1 and 2 can be compressed up to a mutual contact at most. In such a state, as shown in FIG. 5, spring 40 can be moved into a position between a lower rest plate 42 and an upper thrust plate 43 in a motor vehicle and released by correspondingly turning the spindle, until the turn outside pressure plate 1 applies to thrust plate 43 and the two pressure plates 1 and 2 are no longer exposed to the spring pressure. By further turning spindle 4, first, tube 3 is lifted until radial fingers 19 and 20 disengage from recesses, 25 and 26 of plate 1 upwardly and, upon turning guide tube 5 and threaded tube 3 through 90°, can be withdrawn downwardly, through pressure plates 1 and 2. Thereupon, the two pressure plates 1 and 2 are removed from the spring sidewards. To be able to withdraw the clamping assembly downwardly, rest plate 42 has a central hole 42'.

FIG. 6 shows that helical spring 40 may also be inserted in released state so as to protrude by its upper end into a dome 44 of a motor vehicle. Guide tube 5 and threaded tube 3 are withdrawn through pressure plates 1 and 2 in the above described manner. While then lower pressure plate 2 is simply removed sidewards from spring 40, upper pressure plate 1 must first be screwed out along the spring turns into a position out of dome 44, to be also removed in the sideward direction.

FIG. 3 shows a guide tube 5' having the same length as threaded spindle 4, and feathers 15' and 16' completely integrated in its wall. Such a guide tube 5 may easily be combined with the threaded tube 3 of FIGS. 1 and 2. Only, to avoid a limitation of the maximum working stroke by the upper front face 27' of guide tube 5, two axially extending slots 45 and 46 offset through 90° relative to feathers 15' and 16' are provided at diammetrically opposite locations, into which radial fingers 19 and 20 of threaded tube 3, which also extend at 90° to axial groove 17 and 18 can engage. Since in this embodiment of guide tube 5', the feathers 15' and 16' are integral with the guide tube wall over their entire length, they are more resistant to torsion than those feathers 15 and 16 which project beyond the actual length of guide tube 5.

While being connected to the two pressure plates 1 and 2 and to threaded tube 3, guide tube 5' as shown in FIG. 3, with spindle 4 rotatabley received therein, is as easy to handle and operate as guide tube 5 described above.

The spring cramp 50' shown in FIGS. 7, 8 and 9 comprises a guide tube 5/1 which, in the same manner as guide tubes 5 and 5', has a shoulder 12 with two axially extending lugs 13 and 14, and in which spindle 4 is identically mounted for rotation. Guide tube 5/1 has a length equal to that of spindle 4, i.e. the upper front face 27' of tube 5/1 extends substantially in the same plane as the frontal end face of the spindle 4. Instead of two feathers as in the embodiment of FIG. 1, or two keys which might be provided with guide tube 5' of FIG. 3, guide tube 5/1 has an axial guide slot 47 which extends downwardly to the vicinity of shoulder 12, and the slot is open at the upper annular face 27'. Threaded tube 3/1 is provided at its lower end with a radial projection 3' which is axially aligned with the radial finger 20 and intended for being guided for axial displacement in the guide slot 47 of guide tube 5/1 and for establishing the non-rotatable connection between threaded tube 3/1 and guide tube 5/1. The inside diameter of guide tube 5/1 and the outer diameter of threaded tube 3/1 are adjusted to enable threaded tube 3/1 to telescope in guide tube 5/1. To prevent the two radial fingers 19 and 20 of threaded tube 3/1, when engaged into the guide tube 5/1, from butting against the upper face 27' of the guide tube and thus limiting the working stroke, the alignment of radial finger 20 and radial projection 3' is provided, and a second upwardly open axial slot 48 is provided in guide tube 5/1 at a location diametrically opposite to guide slot 47, for radial finger 19. The length 12 of axial slot 48 is shorter by about the length 11 of threaded tube 3/1, than the length 13 of guide slot 47, to avoid an undue reduction of the torsional resistance of guide tube 5/1. To make sure that threaded tube 3/1 can penetrate into guide tube 5/1 completely, even if connected to pressure plate 1' in the way shown in FIG. 8, this pressure plate 1' is provided with a central bore 24', having a diameter which slightly exceeds of guide tube 5/1, so that guide tube 5/1 can penetrate into central bore 24'. The two pressure plates 1' and 2' which are identical in shape with the pressure plates 1 and 2 of the embodiment of FIGS. 1 and 2, are not coated with a friction lining 35 and 36, but provided with concentric guide grooves 49 in which the spring turns directly contacting plates 1', 2' are well centered, or radially held in place, which is important for a uniform, linear clamping of helical spring 40.

In this embodiment and also in that of FIG. 3, it is possible to use two entirely identical pressure plates 1', 2' with the lower one 2' of the pressure plates being positioned either in the manner shown in FIG. 8, i.e. resting on shoulder 12, or being turned through 90° in which instance the two axially extending lugs 13, 14 engage recesses 25 and 26 which also are present. Then, lower pressure plate 2' would apply against the front faces of lugs 13 and 14, not against shoulder 12.

The handling and operation of this spring cramp according to FIGS. 7, 8 and 9 are substantially the same as those of the cramp shown in FIGS. 1 and 2.

While specific embodiments of the invention have been shown and described in detail to illustrate the application of the principles of the invention, it will be understood that the invention may be embodied otherwise without departing from such principles.

What is claimed is:

1. A spring cramp for large helical springs comprising first and second loose disc-shaped pressure plates, each of said plates having a facing contact surface providing a spring turn abutment and each of said plates having a central hole, an internally threaded tube engageable through the hole in said first plate, a guide tube engageable through the hole in said second plate, a threaded spindle journalled in said guide tube and threadably engaged with said internally threaded tube, said guide tube having a radially outwardly projecting shoulder, radially interengageable first projection and groove formation defined between said guide tube and said second plate preventing rotation of said guide tube relative to said second plate, and a second radially interengageable projection and groove formation defined between said guide tube and said threaded tube preventing rotation of said guide tube relative to said threaded tube.

2. A spring cramp according to claim 1, wherein said spring turn abutments provide helically extending contact surfaces, said spindle having a head portion projecting beyond said second plate forming a wrench engagement part, said first projection and groove formation comprising a radially extending lug on said guide tube engageable into said groove on said second plate, said second projection and groove formation comprising a groove defined on said threaded tube and a finger carried by said guide tube engageable into said groove, said threaded tube having at its end remote from the head of said spindle two diametrically opposite radially extending fingers, said first plate having radially extending grooves into which said fingers extend, said feathers carried by said guide tube being axially shiftable along the groove of said guide tube.

3. A spring cramp according to claim 1, wherein said threaded tube is telescopically engageable in said guide tube.

4. A spring cramp according to claim 1, wherein said threaded tube includes a cylindrical outer surface having at least one axially extending groove which is opened at both ends and said guide tube carries at least one axially extending feather which is axially engageable in the groove, said groove and said feather comprising said second projection and groove formation.

5. A spring cramp according to claim 4, wherein said feather terminates at least approximately in the plane in which the spindle end remote from the spindle head extends.

6. A spring cramp according to claim 5, wherein said guide tube has a length at least approximately equal to the length of said spindle.

7. A spring cramp according to claim 1, wherein said threaded tube has a cylindrical outer surface with two diametrically opposite axially extending grooves and a feather carried on each diametric slide of said guide tube engageable in the axial groove, said groove and said feathers comprising said second projection and groove formation.

8. A spring cramp according to claim 1, wherein said threaded tube includes a radial projection on its exterior circumference, said guide tube having an axially extending guide slot into which said projection is engageable, said projection in said slot comprising said second projection and groove formation.

9. A spring cramp according to claim 1, wherein said first projection and groove formation comprises radially outwardly extending lug formed on the circumference of said guide tube and a groove defined along the bore of said second disc-shaped pressure plate, said second projection and groove formation comprising feathers carried by said guide tube and an axially extending groove defined in the surface of said threaded tube, said threaded tube including radially extending finger adjacent its upper end, said first plate having a first plate groove into which said finger engages, said feather extending axially beyond the end of said guide tube.

10. A spring cramp according to claim 1, wherein said threaded tube includes a radial projection adjacent the lower end thereof and has a radial projecting finger adjacent the upper end thereof which is axially aligned with said projection, said guide tube having a first and axial slot extending along a major portion of the length thereof and a first axial slot extending inwardly from the end adjacent said first pressure plate which opens upwardly, said radial finger being movable along said second axial slot and said radial projection being movable along said first axial slot.

11. A spring cramp according to claim 10, wherein said second axial slot is shorter than said first axial slot about the length of said threaded tube.

12. A spring cramp according to claim 1, wherein at least one of said pressure plates is provided with a central bore having a diameter which slightly exceeds the outer diameter of said guide tube, said threaded tube having a radially outwardly extending finger on each diammetrical side being of an axial length which exceeds the radius of the central bore.

13. A spring cramp according to claim 12, wherein said first pressure plate can be brought into tensional connection with the said threaded tube, said first pressure plate having an external rim adjacent its central bore and diametrical recess to which said radial fingers extend and are cross sectionally conformable.

14. A spring cramp according to claim 1, wherein said guide tube has a shoulder adjacent the end engageable with said second pressure plate having at least one axial projection forming a lug, said second plate having a bore with a radial recess conformable to the axial projection of said guide tube and establishing a non-rotatable positive connection therewith comprising said first projection and groove formation.

15. A spring cramp according to claim 1, wherein said pressure plates have contact surfaces for the spring turns of a helical spring to be tensioned which have the shape of angular sectors and are provided with guide grooves and coated with a friction lining.

* * * * *